(12) United States Patent
Xiao et al.

(10) Patent No.: US 11,978,289 B2
(45) Date of Patent: May 7, 2024

(54) METHOD, APPARATUS AND NON-TRANSITORY COMPUTER READABLE STORAGE MEDIUM FOR DRIVING EVALUATION

(71) Applicant: Guangzhou Automobile Group Co., Ltd., Guangdong (CN)

(72) Inventors: Hai Xiao, Sunnyvale, CA (US); Jin Shang, Sunnyvale, CA (US); Lin Chen, Guangdong (CN); Yongling Sun, Guangdong (CN); Xiaosong Yang, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 582 days.

(21) Appl. No.: 17/140,151

(22) Filed: Jan. 4, 2021

(65) Prior Publication Data

US 2022/0215700 A1    Jul. 7, 2022

(51) Int. Cl.
| | | |
|---|---|---|
| *G07C 5/06* | (2006.01) | |
| *B60W 50/04* | (2006.01) | |
| *G06N 5/04* | (2023.01) | |
| *G06N 20/00* | (2019.01) | |

(52) U.S. Cl.
CPC ............ *G07C 5/06* (2013.01); *G06N 5/04* (2013.01); *G06N 20/00* (2019.01); *B60W 50/045* (2013.01)

(58) Field of Classification Search
CPC ........... G07C 5/06; G06N 5/04; G06N 20/00; B60W 50/045; B60W 2552/53; B60W 2555/60; B60W 40/09
See application file for complete search history.

(56) References Cited

U.S. PATENT DOCUMENTS

| | | | |
|---|---|---|---|
| 10,915,964 B1* | 2/2021 | Purgatorio | G06Q 30/0226 |
| 11,625,745 B1* | 4/2023 | Warden | G06Q 30/0226 |
| | | | 705/14.27 |
| 2020/0079387 A1* | 3/2020 | A G | B60W 40/09 |
| 2020/0105130 A1* | 4/2020 | Chen | H04W 4/02 |
| 2020/0164891 A1* | 5/2020 | Bender | B60W 50/0098 |
| 2020/0262423 A1* | 8/2020 | Oboril | G08G 1/161 |
| 2020/0286309 A1* | 9/2020 | Chellapilla | G07C 5/085 |
| 2021/0070286 A1* | 3/2021 | Green | B60W 60/0027 |
| 2021/0183304 A1* | 6/2021 | Baer | B60W 40/09 |
| 2021/0287262 A1* | 9/2021 | Abbott | G06Q 30/0282 |
| 2022/0126878 A1* | 4/2022 | Moustafa | B60W 50/0098 |
| 2022/0188667 A1* | 6/2022 | Burisch | G08G 1/166 |
| 2022/0215700 A1* | 7/2022 | Xiao | B60W 40/09 |

FOREIGN PATENT DOCUMENTS

CN        107038860 A        8/2017

* cited by examiner

*Primary Examiner* — Peter D Nolan
*Assistant Examiner* — Ashley L Redhead, Jr.
(74) *Attorney, Agent, or Firm* — ScienBiziP, P.C.

(57) ABSTRACT

A method, apparatus and non-transitory computer readable storage medium for driving evaluation are provided. The method includes: collecting a set of performance events during conduction of one or more driving tasks; calculating, based on the collected set of performance events and respective weights for the performance events contained in the collected set of performance events, an aggregated performance indicator.

16 Claims, 2 Drawing Sheets

---

Collect a set of performance events during conduction of one or more driving tasks — S102

Calculate, based on the collected set of performance events and respective weights for the performance events contained in the collected set of performance events, an aggregated performance indicator — S104

METHOD, APPARATUS AND
NON-TRANSITORY COMPUTER READABLE
STORAGE MEDIUM FOR DRIVING
EVALUATION

TECHNICAL FIELD

The present disclosure relates to the field of driving management, in particular to a method, apparatus and non-transitory computer readable storage medium for driving evaluation.

BACKGROUND

In the development process of autonomous vehicle, automated driving or ADAS, it is highly needed to evaluate how good a driving task has achieved overall. However, driving is a very complex task; therefore, it is also very complicated to evaluate driving practically in a systematic way. Appropriate technical solution for driving evaluation is needed.

SUMMARY

The following presents a simplified summary in order to provide a basic understanding of some aspects of the present disclosure. This summary is not an extensive overview of the present disclosure. It is intended neither to identify key or critical element of the present disclosure. The following summary merely presents some concepts of the present disclosure in a simplified form as a prelude to the description below.

In accordance with an aspect of the embodiments of the present disclosure, a method for driving evaluation is provided. The method includes: collecting a set of performance events during conduction of one or more driving tasks; calculating, based on the collected set of performance events and respective weights for the performance events contained in the collected set of performance events, an aggregated performance indicator.

In at least one exemplary embodiment, the set of performance events includes one or more of: traffic rule breaking statistic information; traffic accident statistic information; driving behavior statistic information.

In at least one exemplary embodiment, the traffic rule breaking statistic information includes one or more of: lane line infraction counts, traffic sign invasion counts, traffic light invasion counts, speed limit invasion ratio.

In at least one exemplary embodiment, the traffic rule breaking statistic information is absolute statistic information for entire running time of a vehicle, or running average statistic information for last period of time of the vehicle.

In at least one exemplary embodiment, the traffic accident statistic information includes one or more of: collision counts, collision intensity.

In at least one exemplary embodiment, the traffic accident statistic information is absolute statistic information for entire running time of a vehicle, or running average statistic information for last period of time of the vehicle.

In at least one exemplary embodiment, the driving behavior statistic information includes one or more of: energy consumption per unit distance, excessive acceleration or brake counts, average time per unit distance.

In at least one exemplary embodiment, the driving behavior statistic information is absolute statistic information for entire running time of a vehicle, or running average statistic information for last period of time of the vehicle.

In at least one exemplary embodiment, calculating, based on the collected set of performance events and respective weights for the performance events contained in the collected set of performance events, an aggregated performance indicator includes: calculating the aggregated performance indicator AggregatedKPI according to the following formula: $AggregatedKPI = weight_{KPI1} \times EventCount_{KPI1} + \ldots + weight_{KPIi} \times EventCount_{KPIi} + \ldots + weight_{KPIn} \times EventCount_{KPIn}$, where $EventCount_{KPIi}$ denotes the ith performance event in the set of performance events, $weight_{KPIi}$ denotes the weight for the ith performance event in the set of performance events, n denotes the number of performance events contained in the set of performance events.

In at least one exemplary embodiment, after calculating, based on the collected set of performance events and respective weights for the performance events contained in the collected set of performance events, an aggregated performance indicator, the method further includes: determining a driving evaluation result according to the aggregated performance indicator.

In at least one exemplary embodiment, after determining a driving evaluation result according to the aggregated performance indicator, the method further includes: training or optimizing, by using the driving evaluation result based on task profiles, weights for Machine Learning (ML)-based learning or control algorithm; or, generating real-time driving evaluation record according to the driving evaluation result.

In at least one exemplary embodiment, determining a driving evaluation result according to the aggregated performance indicator includes: determining the driving evaluation result Score according to the following formula: $Score = A \times f(-AggregatedKPI)$, where AggregatedKPI denotes the aggregated performance indicator, A denotes an adjustment factor for the driving evaluation result, and $f(x)$ denotes a continuously derivative function.

In at least one exemplary embodiment, $f(x)$ is a sigmoid function.

In at least one exemplary embodiment, $f(x)$ is of a following form: $f(x) = 1/(1+e^{(-x)})$.

In at least one exemplary embodiment, the value of A is set to 2 to make Score fall in a range of (0, 100%].

In at least one exemplary embodiment, collecting a set of performance events during conduction of one or more driving tasks includes one of: collecting, via on-vehicle event sensors, the set of performance events during the conduction of the one or more driving tasks; collecting, via a simulator which conducts the one or more driving tasks within a simulation environment, the set of performance events during the conduction of the one or more driving tasks.

In accordance with another aspect of the embodiments of the present disclosure, an apparatus for driving evaluation is provided. The apparatus includes a hardware processor and a memory, wherein the hardware processor is configured to execute the following program components stored in the memory: a collection component, configured to collect a set of performance events during conduction of one or more driving tasks; a calculation component, configured to calculate, based on the collected set of performance events and respective weights for the performance events contained in the collected set of performance events, an aggregated performance indicator.

In at least one exemplary embodiment, the hardware processor is further configured to execute the following program component stored in the memory: a determination component, configured to determine a driving evaluation result according to the aggregated performance indicator.

In at least one exemplary embodiment, the collection component is configured to: collect, via on-vehicle event sensors, the set of performance events during the conduction of the one or more driving tasks; or collect, via a simulator which conducts the one or more driving tasks within a simulation environment, the set of performance events during the conduction of the one or more driving tasks.

In accordance with still another aspect of the embodiments of the present disclosure, a storage medium, in which a computer program is stored, is provided. The computer program, when being executed by the processor, performs the method in the previously mentioned embodiments of the present disclosure.

In accordance with still another aspect of the embodiments of the present disclosure, an electronic device is provided. The electronic device includes a memory and a processor, wherein a computer program is stored in the memory; and the processor is configured to execute the computer program to perform the method in the previously mentioned embodiments of the present disclosure.

BRIEF DESCRIPTION OF THE DRAWINGS

The accompanying drawings described here are used for providing a deeper understanding of the present disclosure, and constitute a part of the application; schematic embodiments of the present disclosure and description thereof are used for illustrating the present disclosure and not intended to form an improper limit to the present disclosure. In the accompanying drawings.

DETAILED DESCRIPTION OF THE EMBODIMENTS

Figure 1:
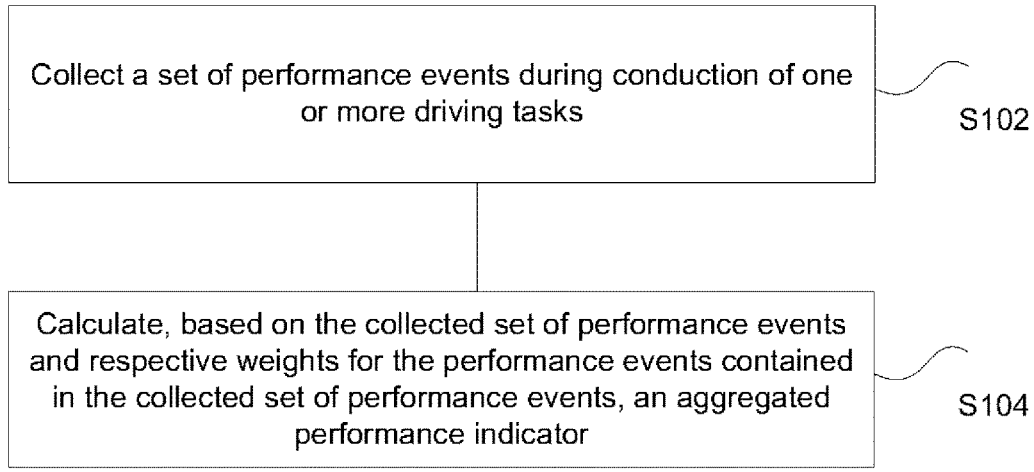
FIG. 1 shows a flowchart of a method for driving evaluation according to an embodiment of the present disclosure.

The evaluation of an end to end driving task may be commenced in a discrete and segregated manner, that very separate measurements on various KPI (Key Performance Indicator) or testing aspects under evaluation may be gathered and benchmarked independently. However, there is a lack of holistic or practical view that how good driving task has achieved overall, especially in the development process of autonomous vehicle, automated driving or ADAS (Advanced Driver Assistance Systems).

In view of the above, the embodiments of the present disclosure propose a method, apparatus and non-transitory computer readable storage medium for driving evaluation. The technical solutions proposed in the embodiments of the present disclosure provide automated systematic evaluation with regarding to how a driving task is executed overall. The technical solutions not only collect individual KPI performances, but also compile an overall driving score in report, weighted on separate KPIs according to certain criteria definition that is tunable and based on specific driving scenario or use cases. In addition to an overall driving score, the technical solutions also extend set of KPIs notably, so that its evaluation on driving task would make most sense of most task profile and test scenario. To sum up, the technical solutions in the embodiments of the present disclosure prescribe the realistic and systematic evaluation methodologies to high level driving task, and could be applied in either automated, ADAS or human driving scenarios.

In order to make those skilled in the art understand the solutions of the present disclosure more clearly, the technical solutions in the embodiments of the present disclosure are clearly and completely elaborated below in combination with the accompanying drawings. It is apparent that the described embodiments are only a part of the embodiments of the present disclosure but not all. Based on the embodiments of the present disclosure, all the other embodiments obtained by those of ordinary skill in the art on the premise of not contributing creative effort belong to the scope of protection of the present disclosure.

It is to be noted that the terms like "first" and "second" in the specification, the claims and the accompanying drawings of the present disclosure are used for differentiating the similar objects, but do not have to describe a specific order or a sequence. It should be understood that the objects may be exchanged under appropriate circumstances, so that the embodiments of the present disclosure described here may be implemented in an order different from that described or shown here. Moreover, the terms like "include" and "have" and any variation of them are intended to cover nonexclusive including; for example, the process, method, system, product or device including a series of steps or units do not have to be limited to those clearly listed steps or units, but may include other steps or units which are not clearly listed or inherent in these process, method, system, product or device.

In accordance with an embodiment of the present disclosure, a method for driving evaluation is provided. The method for driving evaluation may be applied to evaluate the driving tasks conducted in real world by a real vehicle, or conducted in a simulation environment by a simulator. The method may be executed by one or more remote servers or one or more on-vehicle processors. FIG. 1 shows a flowchart of a method for driving evaluation according to an embodiment of the present disclosure. As shown in FIG. 1, the method for driving evaluation includes operations S102 and S104, which will be described in detail as follows.

In operation S102, a set of performance events during conduction of one or more driving tasks is collected.

In at least one exemplary embodiment, the set of performance events may include, but is not limited to, one or more of the following statistic information:

(1) Traffic Rule Breaking Statistic Information

In at least one exemplary embodiment, the traffic rule breaking statistic information is statistic information reflecting the traffic rule breaking in conduction of the one or more driving tasks. The traffic rule breaking statistic information may include one or more of, for example, lane line infraction counts, traffic sign (e.g., stop sign/line) invasion counts, traffic light invasion counts, speed limit invasion ratio (or counts).

In at least one exemplary embodiment, the traffic rule breaking statistic information may be absolute statistic information for entire running time of a vehicle, or running average statistic information for last period of time (e.g., for a given period of time like a day, a week, a month etc.) of the vehicle.

(2) Traffic Accident Statistic Information

In at least one exemplary embodiment, the traffic accident statistic information is statistic information reflecting the traffic accidents happening in conduction of the one or more driving tasks. The traffic accident statistic information may include one or more of, e.g., collision counts, collision intensity.

In at least one exemplary embodiment, the traffic accident statistic information may be absolute statistic information for entire running time of a vehicle, or running average statistic information for last period of time (e.g., for a given period of time like a day, a week, a month etc.) of the vehicle.

(3) Driving Behavior Statistic Information.

In at least one exemplary embodiment, the driving behavior statistic information is statistic information reflecting the driving behavior in conduction of the one or more driving tasks. The driving behavior statistic information may include one or more of: energy (e.g., watt/gallon) consumption per unit distance (e.g., a mile), excessive acceleration or brake counts, average time per unit distance (e.g., a mile).

In at least one exemplary embodiment, the driving behavior statistic information may be absolute statistic information for entire running time of a vehicle, or running average statistic information for last period of time (e.g., for a given period of time like a day, a week, a month etc.) of the vehicle.

Those skilled in the art should understand that there is a large quantity of factors that reflect, or at least partially reflect the driving performance, therefore the set of performance events used for driving evaluation may contain statistic information other than the ones listed herein, and it is to be noted that the specific types of statistics information should not be understood as a limitation to the specific form of the set of performance events.

In at least one exemplary embodiment, the operation S102 may be conducted based on the detected results reported by on-vehicle event sensors, or based on the data generated by a simulator in a simulation environment. Therefore, the operation S102 may include one of:

collecting, via on-vehicle event sensors, the set of performance events during the conduction of the one or more driving tasks;

collecting, via a simulator which conducts the one or more driving tasks within a simulation environment, the set of performance events during the conduction of the one or more driving tasks.

In operation S104, an aggregated performance indicator is calculated based on the collected set of performance events and respective weights for the performance events contained in the collected set of performance events.

In at least one exemplary embodiment, the operation S104 may include: the aggregated performance indicator AggregatedKPI is calculated according to the following formula:

$$AggregatedKPI=weight_{KPI1} \times EventCount_{KPI1}+ \ldots + weight_{KPIi} \times EventCount_{KPIi}+ \ldots + weight_{KPIn} \times EventCount_{KPIn},$$

where $EventCount_{KPIi}$ denotes the ith performance event in the set of performance events, $weight_{KPIi}$ denotes the weight for the ith performance event in the set of performance events, n denotes the number of performance events contained in the set of performance events.

Based on the above formula, each performance event can be weighted while forming an aggregated performance indicator, the weight used for respective performance events could be set based on the affects each performance event has on the driving evaluation.

Figure 2:
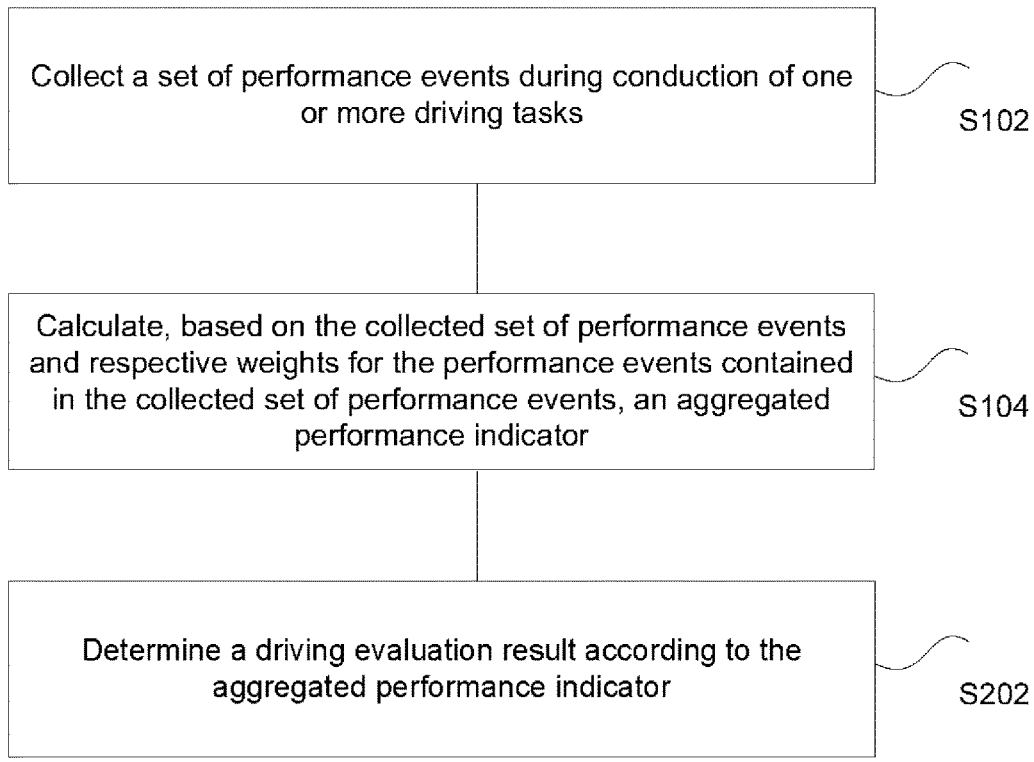
FIG. 2 shows a flowchart of a method for driving evaluation according to an exemplary embodiment of the present disclosure.

Considering that an overall driving score might be needed or expected to more directly and conveniently reflect the evaluation result for driving, a further calculation based on the aggregated performance indicator may be conducted. FIG. 2 shows a flowchart of a method for driving evaluation according to an exemplary embodiment of the present disclosure. As shown in FIG. 2, after the operation S104, the method may further include an operation S202.

In operation S202, a driving evaluation result is determined according to the aggregated performance indicator.

In at least one exemplary embodiment, the operation S202 may be implemented in the following manner:

the driving evaluation result Score is determined according to the following formula:

$$Score=A \times f(-AggregatedKPI),$$

where AggregatedKPI denotes the aggregated performance indicator, A denotes an adjustment factor for the driving evaluation result, which is used for setting up a general value range of the driving evaluation result, and $f(x)$ denotes a continuously derivative function. In at least one exemplary embodiment, $f(x)$ may be a sigmoid function. In at least one exemplary embodiment, $f(x)$ may be of a following form: $f(x)=1/(1+e^{(-x)})$.

In at least one exemplary embodiment, the value of A may be set to 2 to make Score fall in a range of (0, 100%].

In at least one exemplary embodiment, after the operation S202, the method may further include:

(1) weights for Machine Learning (ML)-based learning or control algorithm are trained or optimized, by using the driving evaluation result based on task profiles; or, (2) real-time driving evaluation record is generated according to the driving evaluation result.

The driving evaluation result can be used for various purposes. For example, since the driving evaluation result Score is calculated based on a continuously derivative function, which makes it very suitable for training or optimizing the weights for the ML-based learning or control algorithm based on task profile, the driving evaluation result can be used in ML-based control tasks (for example, the driving evaluation result can be used as a basis for providing dense rewards in enhanced learning), or in the training process for a simulation model. For another example, the driving evaluation result can be automatically calculated in on-vehicle processor so that real-time driving evaluation record can be generated and this real-time driving evaluation record can be used for multi-purpose.

It is to be noted that for the sake of simple description, each aforementioned embodiment of the method is described as a series of action combinations. But those skilled in the art should know that the present disclosure is not limited to a sequence of the described actions, it is because some steps may be performed in other sequences or simultaneously according to the present disclosure. Besides, those skilled in the art should also know that all the embodiments described in the specification are preferred embodiments, and the actions and modules involved may not be necessary.

By means of the above-mentioned descriptions on the implementation manner, those skilled in the art may clearly understand that the disclosure may be implemented by software plus a necessary universal hardware platform according to the methods described in the embodiments, and may also be implemented by hardware certainly, but under most conditions, the former is a better implementation manner. Based on such an understanding, the essential technical solutions of the disclosure, or the part contributing to the conventional art may be implemented in a form of a software product. The computer software product may be stored in a storage medium (such as a Read Only Memory (ROM)/Random Access Memory (RAM), a magnetic disk, and an optical disc) and includes a plurality of instructions for instructing a computing device (which may be a computer, a server, or a network device) to execute the methods described in the embodiments of the disclosure.

Figure 3:
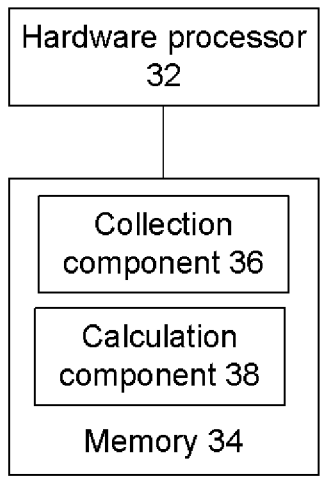
FIG. 3 shows a schematic diagram of the structure of an apparatus for driving evaluation according to an embodiment of the present disclosure.

In accordance with another aspect of the embodiments of the present disclosure, an apparatus for driving evaluation is provided. The apparatus for driving evaluation may be applied to evaluate the driving tasks conducted in real world by a real vehicle, or conducted in a simulation environment by a simulator. FIG. 3 shows a schematic diagram of the structure of an apparatus for driving evaluation according to an embodiment of the present disclosure. The apparatus may be provided in one or more remote servers or one or more on-vehicle processors. As shown in FIG. 3, the apparatus for driving evaluation may include a hardware processor 32 and a memory 34, wherein the hardware processor 32 is configured to execute program components including a collection component 36 and a calculation component 38 stored in the memory 34.

The collection component 36 is configured to collect a set of performance events during conduction of one or more driving tasks.

In at least one exemplary embodiment, the set of performance events may include, but is not limited to, one or more of the following statistic information:

(1) Traffic Rule Breaking Statistic Information

In at least one exemplary embodiment, the traffic rule breaking statistic information is statistic information reflecting the traffic rule breaking in conduction of the one or more driving tasks. The traffic rule breaking statistic information may include one or more of, for example, lane line infraction counts, traffic sign (e.g., stop sign/line) invasion counts, traffic light invasion counts, speed limit invasion ratio (or counts).

In at least one exemplary embodiment, the traffic rule breaking statistic information may be absolute statistic information for entire running time of a vehicle, or running average statistic information for last period of time (e.g., for a given period of time like a day, a week, a month etc.) of the vehicle.

(2) Traffic Accident Statistic Information

In at least one exemplary embodiment, the traffic accident statistic information is statistic information reflecting the traffic accidents happening in conduction of the one or more driving tasks. The traffic accident statistic information may include one or more of, e.g., collision counts, collision intensity.

In at least one exemplary embodiment, the traffic accident statistic information may be absolute statistic information for entire running time of a vehicle, or running average statistic information for last period of time (e.g., for a given period of time like a day, a week, a month etc.) of the vehicle.

(3) Driving Behavior Statistic Information.

In at least one exemplary embodiment, the driving behavior statistic information is statistic information reflecting the driving behavior in conduction of the one or more driving tasks. The driving behavior statistic information may include one or more of: energy (e.g., watt/gallon) consumption per unit distance (e.g., a mile), excessive acceleration or brake counts, average time per unit distance (e.g., a mile).

In at least one exemplary embodiment, the driving behavior statistic information may be absolute statistic information for entire running time of a vehicle, or running average statistic information for last period of time (e.g., for a given period of time like a day, a week, a month etc.) of the vehicle.

Those skilled in the art should understand that there is a large quantity of factors that reflect, or at least partially reflect the driving performance, therefore the set of performance events used for driving evaluation may contain statistic information other than the ones listed herein, and it is to be noted that the specific types of statistics information should not be understood as a limitation to the specific form of the set of performance events.

In at least one exemplary embodiment, the collection component 36 may collect the set of performance events based on the detected results reported by on-vehicle event sensors, or based on the data generated by a simulator in a simulation environment. Therefore, in at least one exemplary embodiment, the collection component 36 may be configured to:

collect, via on-vehicle event sensors, the set of performance events during the conduction of the one or more driving tasks; or collect, via a simulator which conducts the one or more driving tasks within a simulation environment, the set of performance events during the conduction of the one or more driving tasks.

The calculation component 38 is configured to calculate, based on the collected set of performance events and respective weights for the performance events contained in the collected set of performance events, an aggregated performance indicator.

In at least one exemplary embodiment, the calculation component 38 may calculate the aggregated performance indicator in the following manner:

the calculation component 38 may be configured to calculate the aggregated performance indicator AggregatedKPI according to the following formula:

$$\text{AggregatedKPI} = \text{weight}_{KPI_1} \times \text{EventCount}_{KPI_1} + \ldots + \text{weight}_{KPI_i} \times \text{EventCount}_{KPI_i} + \ldots + \text{weight}_{KPI_n} \times \text{EventCount}_{KPI_n},$$

where $\text{EventCount}_{KPI_i}$ denotes the ith performance event in the set of performance events, $\text{weight}_{KPI_i}$ denotes the weight for the ith performance event in the set of performance events, n denotes the number of performance events contained in the set of performance events.

Based on the above formula, each performance event can be weighted while forming an aggregated performance indicator, the weight used for respective performance events could be set based on the affects each performance event has on the driving evaluation.

Figure 4:
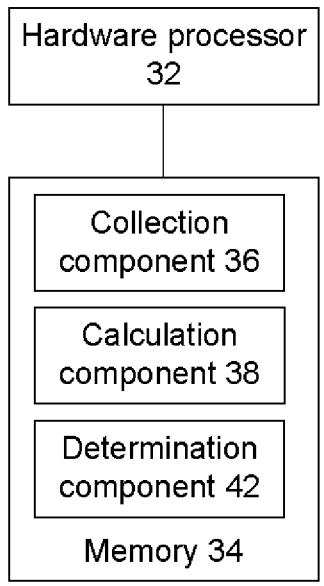
FIG. 4 shows a schematic diagram of the structure of the method for driving evaluation according to an exemplary embodiment of the present disclosure.

Considering that an overall driving score might be needed or expected to more directly and conveniently reflect the evaluation result for driving, a further calculation based on the aggregated performance indicator may be conducted. FIG. 4 shows a schematic diagram of the structure of the method for driving evaluation according to an exemplary embodiment of the present disclosure. As shown in FIG. 4, the hardware processor 32 may be further configured to execute the following program component stored in the memory 34:

a determination component 42, configured to determine a driving evaluation result according to the aggregated performance indicator.

In at least one exemplary embodiment, the determination component 42 may determine the driving evaluation result in the following manner:

the determination component 42 may be configured to determine the driving evaluation result Score according to the following formula:

$$Score = A \times f(-AggregatedKPI),$$

where AggregatedKPI denotes the aggregated performance indicator, A denotes an adjustment factor for the driving evaluation result, which is used for setting up a general value range of the driving evaluation result, and $f(x)$ denotes a continuously derivative function. In at least one exemplary embodiment, $f(x)$ may be a sigmoid function. In at least one exemplary embodiment, $f(x)$ may be of a following form: $f(x)=1/(1+e^{\wedge}(-x))$.

In at least one exemplary embodiment, the value of A may be set to 2 to make Score fall in a range of (0, 100%].

In at least one exemplary embodiment, the determination component 42 may be further configured to:

(1) train or optimize, by using the driving evaluation result based on task profiles, weights for Machine Learning (ML)-based learning or control algorithm; or, (2) generate real-time driving evaluation record according to the driving evaluation result.

The driving evaluation result can be used for various purposes. For example, since the driving evaluation result Score is calculated based on a continuously derivative function, which makes it very suitable for training or optimizing the weights for the ML-based learning or control algorithm based on task profile, the driving evaluation result can be used in ML-based control tasks (for example, the driving evaluation result can be used as a basis for providing dense rewards in enhanced learning), or in the training process for a simulation model. For another example, the driving evaluation result can be automatically calculated in on-vehicle server so that real-time driving evaluation record can be generated and this real-time driving evaluation record can be used for multi-purpose.

The apparatus is configured to implement the above-mentioned embodiment and exemplary implementation manners related to the method for driving evaluation. As used above, the components described as separate parts may be or may not be separate physically. The part shown as the component may be or may not be a physical component. It is possible to select, according to the actual needs, part or all of the components to achieve the objective of the solutions in the present disclosure. Although the apparatus described in the present embodiment is implemented by software preferably, the implementation of hardware or a combination of the software and the hardware may also be conceivable. It is to be noted that the software-based component may be implemented in the following manner, but is not limited thereto: the above components are executed in the same processor; or the above components are respectively executed in different processors in any combined form.

In accordance with still another aspect of the embodiments of the present disclosure, a non-transitory computer readable storage medium, in which a computer program is stored, is provided. The computer program, when being executed by the processor, performs the following operations:

S1, collecting a set of performance events during conduction of one or more driving tasks;

S2, calculating, based on the collected set of performance events and respective weights for the performance events contained in the collected set of performance events, an aggregated performance indicator.

Optionally, in the embodiment, the non-transitory computer readable storage medium may include but not limited to: various media capable of storing the computer program such as a U disk, an ROM, an RAM, a mobile hard disk, a magnetic disk or an optical disc.

Optionally, the specific example in this embodiment may be referred to the examples described in the above embodiments and optional implementation manners and will no longer be repeated herein.

In accordance with still another aspect of the embodiments of the present disclosure, an electronic device is provided. The electronic device includes a memory and a processor, wherein a computer program is stored in the memory; and the processor is configured to execute the computer program to perform the following operations:

S1, collecting a set of performance events during conduction of one or more driving tasks;

S2, calculating, based on the collected set of performance events and respective weights for the performance events contained in the collected set of performance events, an aggregated performance indicator.

Optionally, the electronic device may further include a transmission device and an input/output device, and the transmission device is connected to the processor, and the input/output device is connected to the processor.

Optionally, the specific example in this embodiment may be referred to the examples described in the above embodiments and optional implementation manners and will no longer be repeated herein.

According to still another embodiment of the present disclosure, a detailed technical solution for driving evaluation is described as follows.

Two main parts of the new concept are:

(1) Collection of a set of individual performance events (KPI), which includes but not limited to:

Lane line infraction counts (absolute or running average of last period of time);

Traffic sign (e.g. stop sign/line) invasion counts (absolute or running average);

Traffic light invasion counts (absolute or running average);

Collision counts (absolute or running average);

Energy (watt/gallon) consumption per mile;

Excessive acceleration/brake counts;

Speed limit invasion ratio;

Average time per mile;

. . .

The collection of the identified set of individual performance events can be implemented on both simulated vehicle in simulator and certain real vehicle via on-vehicle event sensors respectively:

When driving task is conducted within a simulation environment, the set of interested KPI event counters can be collected conveniently from the simulator.

When driving task is conducted in real world, on the contrary these KPI events can be collected and processed from real on-vehicle event sensors, such as Lane watch, Object spotting, Traffic Sign Recognition, energy usage sensors, and odometers etc.

(2) Assume each regularized event above as a KPI, with set of predefined weights, we define:

$$AggregatedKPIs = weight_{KPI1} \times EventCount_{KPI1} + weight_{KPI2} \times EventCount_{KPI2} + weight_{KPI3} \times EventCount_{KPI3} + \ldots + weight_{KPIn} \times EventCount_{KPIn}.$$

After AggregatedKPIs has been obtained, an overall driving score defined as below or a similar fashion can be calculated:

$$Score = 2.0 \times sigmoid(-AggregatedKPIs) = \frac{2.0}{1 + e^{AggregatedKPIs}}.$$

This Score will be in the (0, 100%] range, for easy human interpretation, and it is C1 continuous wrt. derivative to any individual KPI, easy for learning method if used.

By incorporating the new concept proposed in the embodiments of the present disclosure into the driving arena, the evaluation of high level driving task can be enhanced practically, which will then provide a systematic approach for vehicle OEMs to evaluate driving controller performance from an upstream technology vendor. On the other hand, similar methodology of systematic evaluation can also provide user or developer a panoramic view of performance of the driving stack in question with any specific driving scenario.

It is apparent that those skilled in the art should know that each component or each step of the present disclosure may be implemented through a universal computing device. They may be concentrated in a single computing device or distributed in a network formed by multiple computing devices. In at least one exemplary embodiment, they may be implemented by program codes executable for the computing devices and thus may be stored in a storage device for execution with the computing devices. Moreover, in some cases, the shown or described operations may be executed in sequences different from those described here, or may form various integrated circuit modules respectively, or multiple modules or operations therein may form a single integrated circuit component for implementation. Therefore, the present disclosure is not limited to any specific hardware and software combination.

The above is only the exemplary embodiments of the present disclosure; it should be indicated that, on the premise of not departing from the principles of the present disclosure, those of ordinary skill in the art may also make a number of improvements and supplements, and these improvements and supplements should fall within the scope of protection of the present disclosure.

What is claimed is:

1. A method for driving evaluation, comprising:
   collecting a set of performance events by on-vehicle event sensors during conduction of one or more driving tasks;
   calculating, based on the collected set of performance events and respective weights for the performance events contained in the collected set of performance events, an aggregated performance indicator;
   determining a driving evaluation result according to the aggregated performance indicator, comprising: determining the driving evaluation result Score according to the following formula: Score=A×ƒ(−AggregatedKPI), where AggregatedKPI denotes the aggregated performance indicator, A denotes an adjustment factor for the driving evaluation result, and ƒ(x) denotes a continuously derivative function; and
   training or optimizing, by using the driving evaluation result based on task profiles, weights for Machine Learning (ML)-based learning or control algorithm;
   generating real-time driving evaluation record according to the driving evaluation result.

2. The method for driving evaluation as claimed in claim 1, wherein the set of performance events comprises one or more of:
   traffic rule breaking statistic information;
   traffic accident statistic information;
   driving behavior statistic information.

3. The method for driving evaluation as claimed in claim 2, wherein the traffic rule breaking statistic information comprises one or more of: lane line infraction counts, traffic sign invasion counts, traffic light invasion counts, speed limit invasion ratio.

4. The method for driving evaluation as claimed in claim 3, wherein the traffic rule breaking statistic information is absolute statistic information for entire running time of a vehicle, or running average statistic information for last period of time of the vehicle.

5. The method for driving evaluation as claimed in claim 2, wherein the traffic accident statistic information comprises one or more of: collision counts, collision intensity.

6. The method for driving evaluation as claimed in claim 5, wherein the traffic accident statistic information is absolute statistic information for entire running time of a vehicle, or running average statistic information for last period of time of the vehicle.

7. The method for driving evaluation as claimed in claim 2, wherein the driving behavior statistic information comprises one or more of: energy consumption per unit distance, excessive acceleration or brake counts, average time per unit distance.

8. The method for driving evaluation as claimed in claim 7, wherein the driving behavior statistic information is absolute statistic information for entire running time of a vehicle, or running average statistic information for last period of time of the vehicle.

9. The method for driving evaluation as claimed in claim 1, wherein calculating, based on the collected set of performance events and respective weights for the performance events contained in the collected set of performance events, an aggregated performance indicator comprises:
   calculating the aggregated performance indicator AggregatedKPI according to the following formula:
   AggregatedKPI=$weight_{KPI1} \times EventCount_{KPI1} + \ldots + weight_{KPIi} \times EventCount_{KPIi} + \ldots + weight_{KPIn} \times EventCount_{KPIn}$, where $EventCount_{KPIi}$ denotes the ith performance event in the set of performance events, $weight_{KPIi}$ denotes the weight for the ith performance event in the set of performance events, n denotes the number of performance events contained in the set of performance events.

10. The method for driving evaluation as claimed in claim 1, wherein the value of A is set to 2 to make Score fall in a range of (0, 100%].

11. The method for driving evaluation as claimed in claim 1, wherein collecting a set of performance events during conduction of one or more driving tasks comprises:
   collecting, via a simulator which conducts the one or more driving tasks within a simulation environment, the set of performance events during the conduction of the one or more driving tasks.

12. The method for driving evaluation as claimed in claim 1, wherein ƒ(x) is a sigmoid function and is of a following form: ƒ(x)=1/(1+eˆ(−x)).

13. An apparatus for driving evaluation, comprising:
a storage device;
a processor; and
the storage device storing a program, which when executed by the processor, cause the processor to:
collect a set of performance events by on-vehicle event sensors during conduction of one or more driving tasks;
calculate an aggregated performance indicator, based on the collected set of performance events and respective weights for the performance events contained in the collected set of performance events; determine a driving evaluation result according to the aggregated performance indicator, comprising: determining the driving evaluation result Score according to the following formula: Score=A×$f$(−AggregatedKPI), where AggregatedKPI denotes the aggregated performance indicator, A denotes an adjustment factor for the driving evaluation result, and $f$(x) denotes a continuously derivative function; and
train or optimize, by using the driving evaluation result based on task profiles, weights for Machine Learning (ML)-based learning or control algorithm;
generate real-time driving evaluation record according to the driving evaluation result.

14. The apparatus for driving evaluation as claimed in claim 13, wherein the processor further caused to:
collect, via a simulator which conducts the one or more driving tasks within a simulation environment, the set of performance events during the conduction of the one or more driving tasks.

15. A non-transitory computer readable storage medium containing computer instructions stored therein for causing a computer processor to perform a method for driving evaluation, wherein the method comprises:
collecting a set of performance events by on-vehicle event sensors during conduction of one or more driving tasks;
calculating, based on the collected set of performance events and respective weights for the performance events contained in the collected set of performance events, an aggregated performance indicator;
determining a driving evaluation result according to the aggregated performance indicator, comprising: determining the driving evaluation result Score according to the following formula: Score=A×$f$(−AggregatedKPI), where AggregatedKPI denotes the aggregated performance indicator, A denotes an adjustment factor for the driving evaluation result, and $f$(x) denotes a continuously derivative function; and
training or optimizing, by using the driving evaluation result based on task profiles, weights for Machine Learning (ML)-based learning or control algorithm;
generating real-time driving evaluation record according to the driving evaluation result.

16. An electronic device, comprising a memory and a processor, wherein a computer program is stored in the memory; and the processor is configured to execute the computer program to perform a method for driving evaluation, wherein the method comprises:
collecting a set of performance events by on-vehicle event sensors during conduction of one or more driving tasks;
calculating, based on the collected set of performance events and respective weights for the performance events contained in the collected set of performance events, an aggregated performance indicator;
determining a driving evaluation result according to the aggregated performance indicator, comprising: determining the driving evaluation result Score according to the following formula: Score=A×$f$(−AggregatedKPI), where AggregatedKPI denotes the aggregated performance indicator, A denotes an adjustment factor for the driving evaluation result, and $f$(x) denotes a continuously derivative function; and
training or optimizing, by using the driving evaluation result based on task profiles, weights for Machine Learning (ML)-based learning or control algorithm;
generating real-time driving evaluation record according to the driving evaluation result.

\* \* \* \* \*